United States Patent
Lastinger et al.

(12)
(10) Patent No.: US 6,223,662 B1
(45) Date of Patent: May 1, 2001

(54) APPARATUS FOR PRODUCING AND PLANTING SPRIGS FROM BULK SOD

(75) Inventors: Anthony W. Lastinger, Gainesville; Jesse B. Grimsley, Jr., Parrott, both of GA (US)

(73) Assignee: Spriggers Choice, Inc., Dawson, GA (US)

( * ) Notice: Subject to any disclaimer, the term of this patent is extended or adjusted under 35 U.S.C. 154(b) by 0 days.

(21) Appl. No.: 09/359,983

(22) Filed: Jul. 23, 1999

(51) Int. Cl.$^7$ .................................................. A01C 11/00
(52) U.S. Cl. ........................ 111/104; 111/901; 111/100; 83/325
(58) Field of Search ..................... 111/104, 105, 111/109, 114, 100, 101, 901, 199, 200; 172/20; 83/865, 863, 331, 325, 509

(56) References Cited

U.S. PATENT DOCUMENTS

| | | | | |
|---|---|---|---|---|
| 2,889,878 | * | 6/1959 | White et al. | 164/48 |
| 3,410,350 | * | 11/1968 | Ware | 172/32 |
| 3,589,319 | * | 6/1971 | Peters | 111/2 |
| 3,939,785 | * | 2/1976 | Duffy | 111/3 |
| 4,043,231 | * | 8/1977 | Friedberg | 83/9 |
| 4,119,002 | * | 10/1978 | Coldiron | 83/120 |
| 4,162,709 | * | 7/1979 | Wilson | 172/20 |
| 4,289,080 | * | 9/1981 | Penley | 111/3 |
| 4,294,316 | * | 10/1981 | Hedley et al. | 172/20 |
| 5,083,517 | * | 1/1992 | Stevens et al. | 111/104 |

* cited by examiner

Primary Examiner—Victor Batson
(74) Attorney, Agent, or Firm—Robert J. Veal; Robert M. Jackson; Burr & Forman LLP

(57) ABSTRACT

An apparatus for producing grass sprigs from bulk sod, evenly distributing the grass sprigs on the ground to be planted, and thereafter planting the grass sprigs. The apparatus comprises a rigid frame member having a driven conveyor assembly, a bulk sod shredding assembly, and a planting assembly. The driven conveyor transports bulk sod to the shredder assembly at a rate proportional to the ground speed of the apparatus, thus providing the proper sprig output rate from the shredder. The shredding assembly utilizes a rotating shaft having a plurality of shredding members extending therefrom for shredding the bulk sod cooperatively with a shredder bar. The planting assembly comprises a sizable chute for guiding the sprigs from the shredder to the ground to be planted without clogging, a plurality of coulters for pressing the sprigs into the ground, and a plurality of press wheels for firming the soil planted subsequent to the coulters.

12 Claims, 8 Drawing Sheets

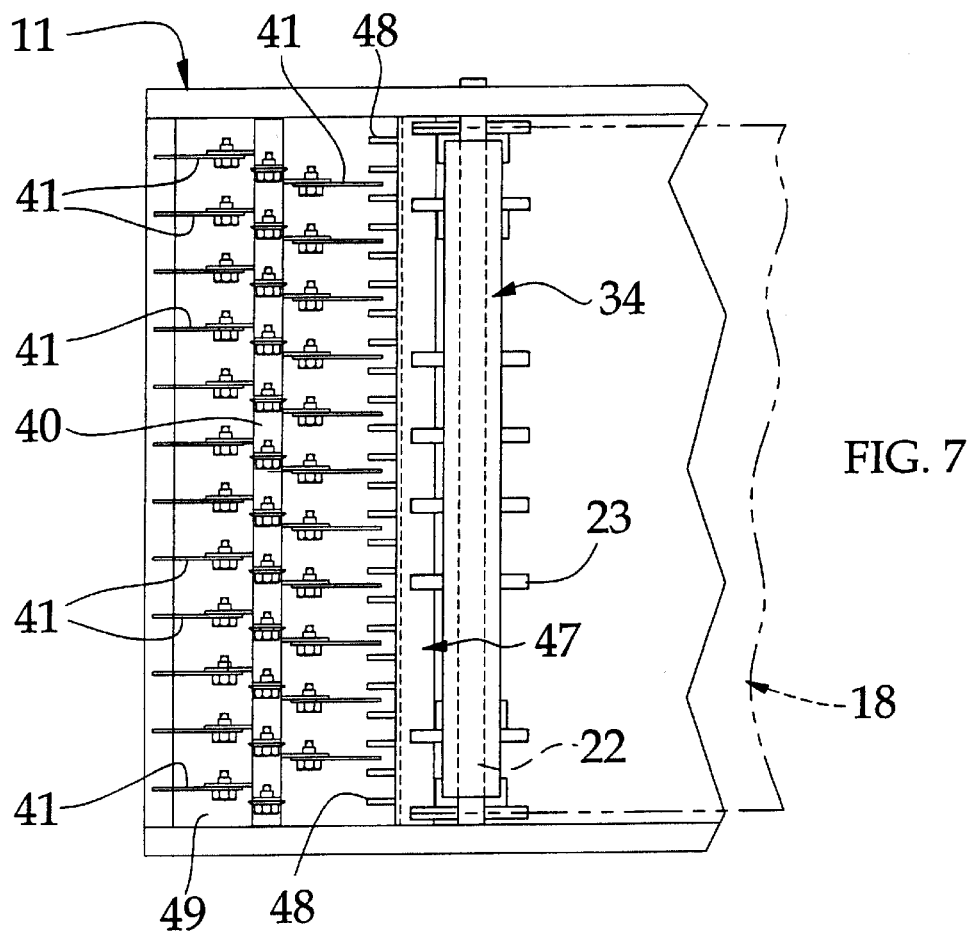
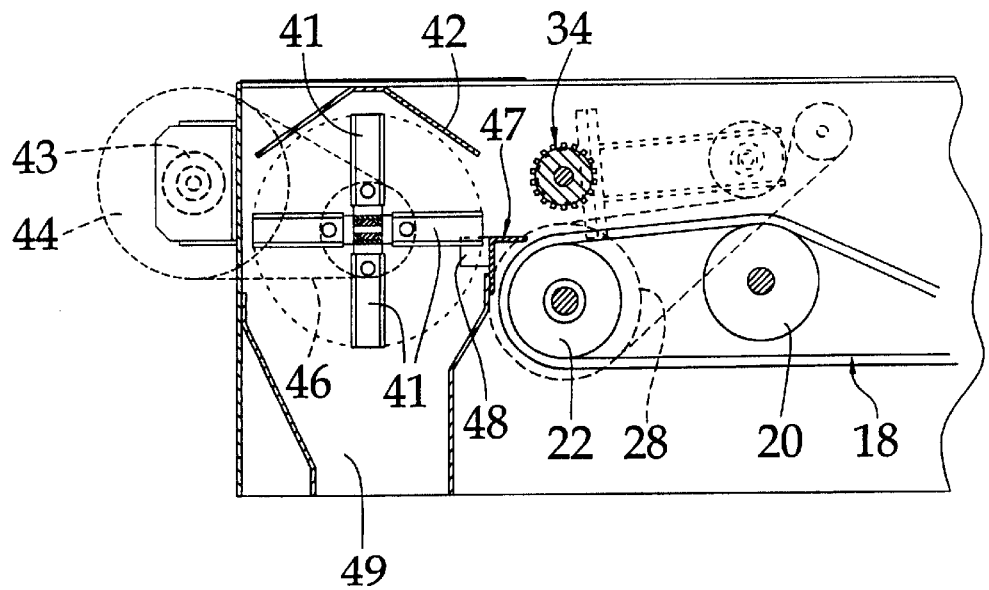
FIG. 7
FIG. 8

APPARATUS FOR PRODUCING AND PLANTING SPRIGS FROM BULK SOD

FIELD OF THE INVENTION

The present invention relates to a grass planting apparatus. With greater particularity, the present invention relates to an apparatus for planting grass sprigs produced from bulk sod. With even further particularity, the present invention pertains to an apparatus capable of shredding bulk portions of sod into grass sprigs, depositing the grass sprigs on the ground, sprigging the grass sprigs to a predetermined depth into the ground, and thereafter re-firming the sprigged soil.

BACKGROUND OF THE INVENTION

Various apparatuses have been designed to cut grown sod from a first location and thereafter replant the cut bulk sod in a second location, while maintaining healthy sod life. However, it has been found that the bulk sod removed from the ground can be cut into smaller portions termed sprigs, and thereafter dispersed about the area to be planted, while maintaining a healthy sod growth. The improvement of the instant invention maximizes the area planted from a portion of bulk sod.

Numerous apparatuses have also been designed to plant the aforementioned sprigs. One such apparatus is a Sprig Planting Apparatus embodied in U.S. Pat. No. 3,939,785 to Duffy. This patent teaches a sprig planting apparatus adapted to distribute and press grass sprigs into the ground having a sprig hopper mounted on a portable frame for holding grass sprigs to be planted, a conveyor for transporting the sprigs from the hopper to an opening in the frame for planting, a sprig distributing device for distributing the sprigs on the ground to be planted, and a plurality of discs rotatably suspended below the frame for pressing the grass sprigs into the ground to be planted. This device, although capable of planting sprigs, is nonetheless limited to applications and locations where precut sprigs are available. Further, inasmuch as it is known in the art that firming soil subsequent to pulling a disc over it substantially increases the likelihood of a successful plant, the present apparatus is again not capable of efficient and reliable operation.

Another sod planting apparatus is shown in U.S. Pat. No. 5,083,517 to Stevens et al. This apparatus utilizes a vertically oriented chute for receiving and feeding a strip of sod to a rotating cutting mechanism. The cutting mechanism cuts the gravitationally fed strips of sod into smaller generally square pieces of sod, which are thereafter transported to the ground by a discharging means. This apparatus, although not dependent upon the availability of the plugs, also presents substantial limitations. First, inasmuch as the strips of sod are gravitationally fed to the cutting means through feeder chutes, no control as to the feed rate is available, and therefore, the output rate of the apparatus is substantially limited in controllability. The feeder chutes are also manufactured to be of sufficient cross section as to accommodate various thickness' of sod. However, this additional cross sectional area used to accommodate thicker strips of sod allows for the thinner strips of sod to bind in the feeder chutes, and therefore hinder the efficient operation of the apparatus. Further, the rotational speed of the cutting means of this apparatus is controlled by the power take off of the vehicle pulling the apparatus. Thus, the sod distribution rate of the apparatus is often not even, as the operator must carefully match the ground speed of the apparatus with the rotation speed of the cutting means as determined by the pressure of the power take off in order to obtain even distribution of the small squares of sod on the ground to be planted. Additionally, the small squares of sod, once cut from the bulk strip of sod, are carried to the ground to be planted through a plurality of delivery chutes. These chutes, which have a tendency to clog, further hindering even distribution of the small squares on the ground to be planted, thus reducing the effectiveness and efficiency of the apparatus.

Therefore, in view of the obvious limitations and deficiencies of the present apparatuses, there is a well found need for a self-contained apparatus capable of converting bulk sod into grass sprigs, and thereafter planting such sprigs. Further, there is a need for a sprig producing and planting apparatus having a reliable means for feeding bulk sod to a shredder for producing sprigs, and a reliable means for evenly distributing the grass sprigs produced on the ground to be planted.

SUMMARY OF THE INVENTION

Thus, in view of the deficiencies in the previously noted apparatuses, it is an object of the present invention to provide an apparatus for producing and planting sprigs from bulk sod. It is a further object of the present invention to provide an apparatus capable of producing and planting grass sprigs from bulk sod in sheet or roll form. It is a further object of the present invention to provide an apparatus for producing and planting grass sprigs from bulk sod utilizing an easy to maintain shredder having a single rotating shredder element. It is a further object of the present invention to provide an apparatus for producing and planting grass sprigs from bulk sod utilizing an adjustable rate horizontal conveyor assembly to feed bulk sod to a shredder, thereby allowing for the control of the feed rate of the bulk sod to the shredder. Further, it is an object of the present invention to provide an apparatus for producing and planting grass sprigs from bulk sod without jamming sod within the shredder, and therefore allowing for even distribution of grass sprigs on the ground to be planted. Further, it is an object of the present invention to provide an apparatus for producing and planting sprigs having a selectively variable sprig output distribution rate. It is a further object of the present invention to provide an apparatus for producing and planting sprigs of grass utilizing a coulter to press sprigs into the ground and a gauge roller to re-firm the ground after pressing by the coulter.

BRIEF DESCRIPTION OF THE DRAWINGS

An apparatus embodying the features of the present invention is depicted in the accompanying drawings, which form a portion of this disclosure, wherein:

FIG. 7 a top plan view of the forward end of the sprigger showing the shredder assembly, feeder roller and conveyor; and, FIG. 8 is a sectional view of the forward end of the sprigger showing the shredder assembly, feeder roller and conveyor.

DETAILED DESCRIPTION OF THE PREFERRED EMBODIMENT

Figure 1A:
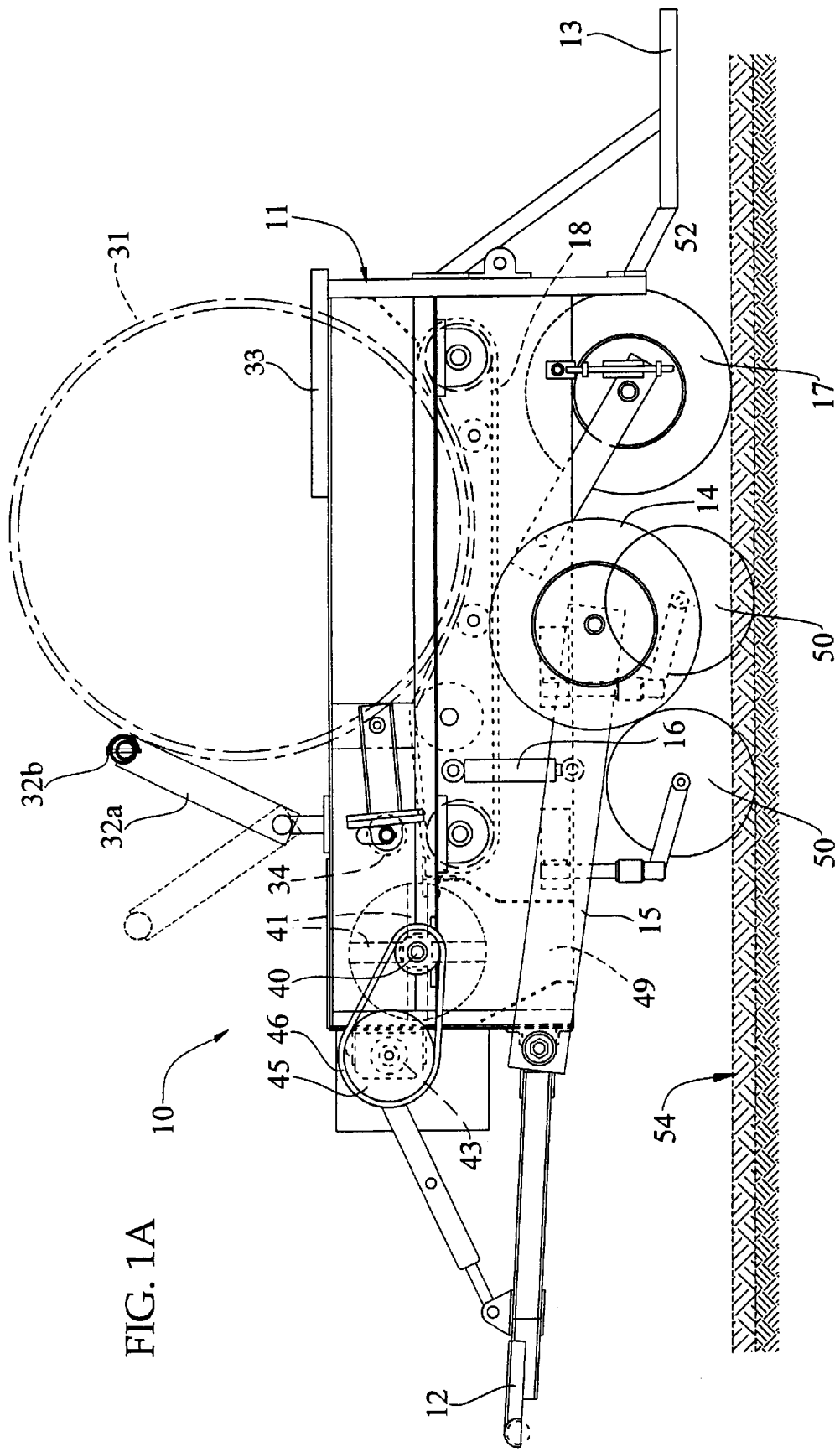
FIG. 1A is a side elevational view of the present invention shown in operating position.
Figure 1B:
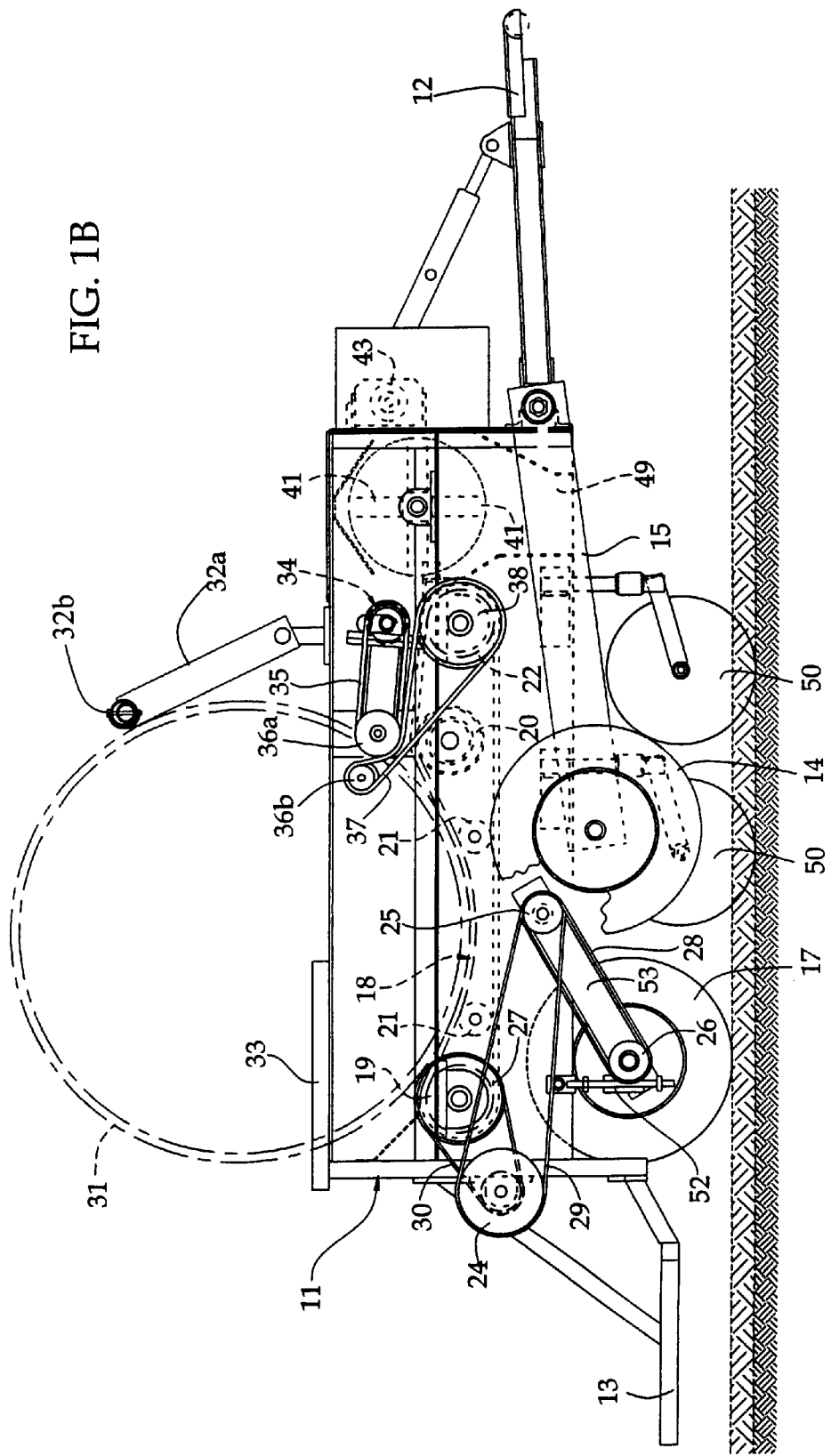
FIG. 1B is a side elevational view of the side opposite that shown in FIG. 1.
Figure 2:
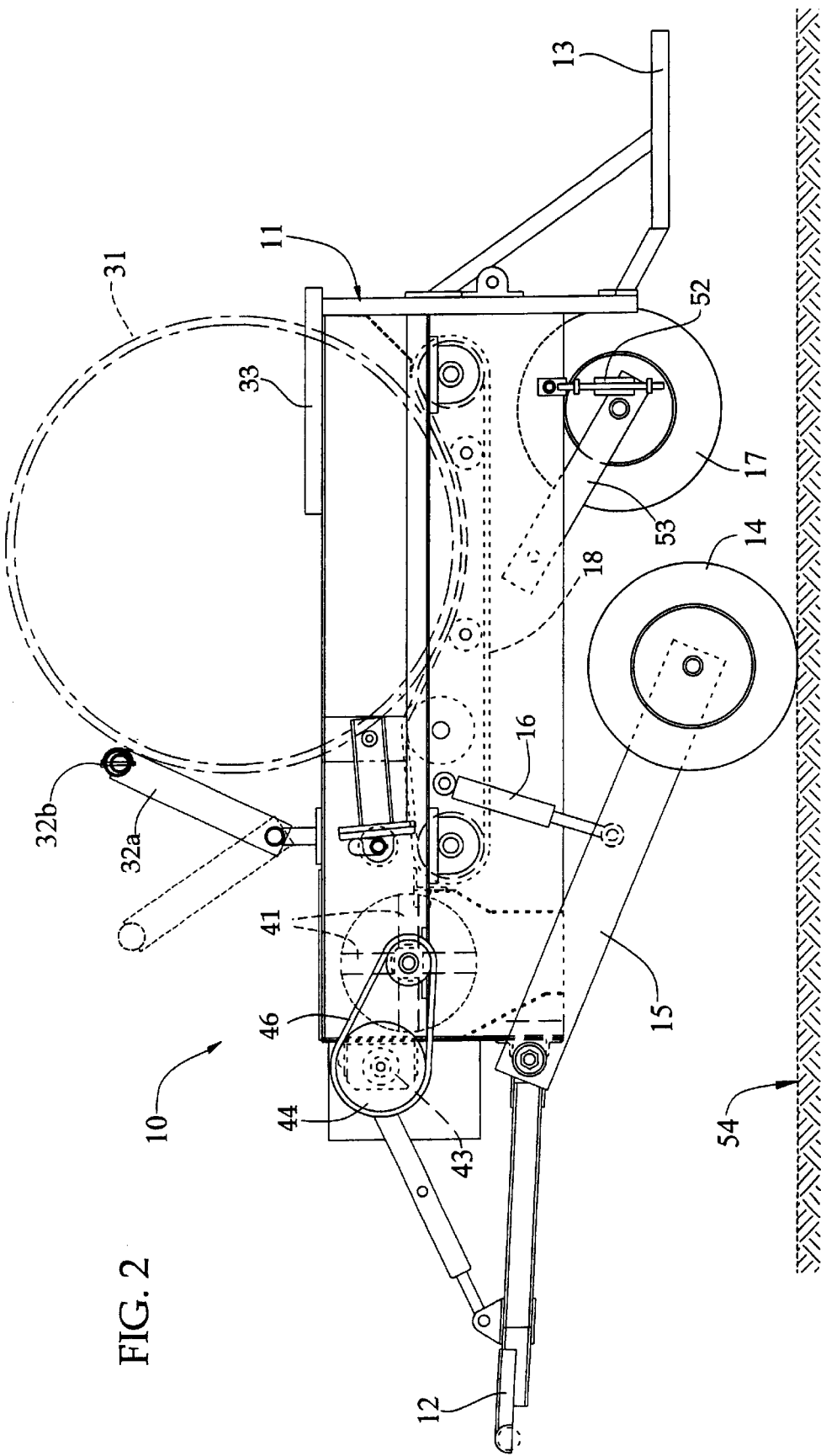
FIG. 2 is a side elevational view of the sprigger shown in transport position.
Figure 3:
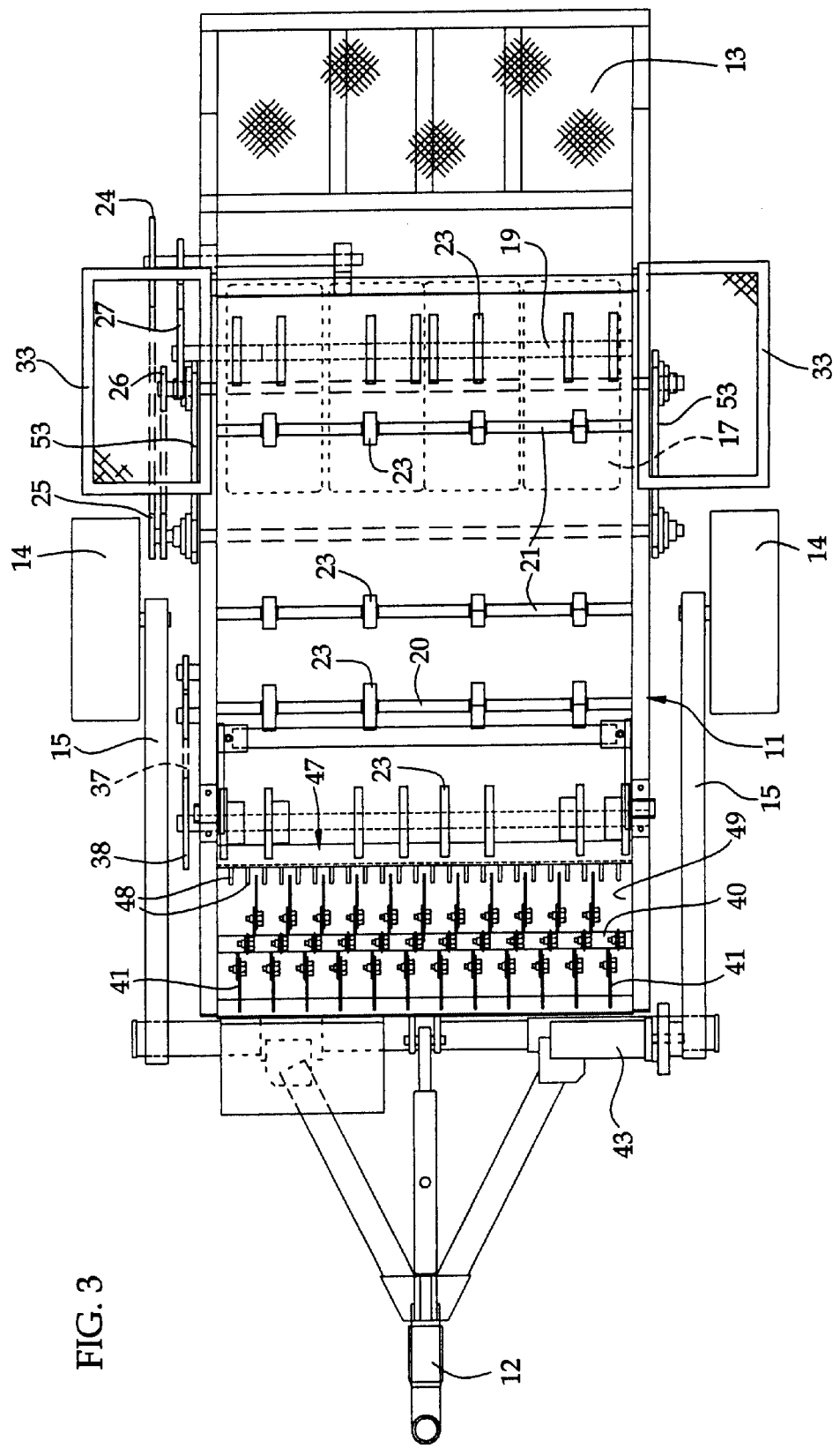
FIG. 3 is a top plan view of the sprigger.

Referring to the drawings for a better understanding of the principles of operation and structure of the invention, it will be seen that FIGS. 1a & 1b show side views of sprigger 10. Sprigger 10 generally includes a rigid frame member 11 having a towing assembly 12 attached to the front end for transporting sprigger 10, generally by mechanically engaging a motor vehicle such as a tractor. The rear end of sprigger 10 has an operator support platform 13 attached thereto for supporting the weight of the operator of sprigger 10. The upper portion of the rear end of sprigger 10 can optionally be fitted with a sod storage platform 33, for holding bulk strips of sod to be placed into sprigger 10. During non-operational transportation of sprigger 10, the weight of sprigger 10 is supported by towing assembly 12 and road wheels 14. Road wheels 14 are rotatably mounted to road wheel support members 15, which are pivotally mounted to the front of rigid frame member 11. Road wheels 14 are caused to pivot away from the bottom of sprigger 10 via extension of hydraulic cylinders 16, which are pivotally attached at a first end to frame member 11 and at a second end to road wheel support member 15, thereby elevating sprigger 10 vertically above contact with the ground. During operation of sprigger 10, road wheels 14 are retracted by actuation of hydraulic cylinders 16 such that the operational components of sprigger 10 contact the ground. In typical operation of sprigger 10, road wheels 14 are fully retracted such that they are not in contact with the ground. Thus, during operation, the weight of sprigger 10 is supported by towing assembly 12 and adjustably mounted gauge wheels 17, which will be fully discussed herein.

Generally speaking, sprigger 10 can be divided into three main components: first, a driven conveyor assembly; second, a driven shredder assembly; and third, a planting assembly. The conveyor assembly serves to transport bulk sod to the shredder assembly, which shreds the sod into sprigs and deposits the sprigs on the ground to be planted. Thereafter, the planting assembly presses the sprigs into the ground and re-firms the soil pressed. With particularity, the driven conveyor assembly includes a wide continuous conveyor belt 18 rotatably supported by rear conveyor support/drive roller 19, front conveyor support roller 20, intermediate conveyor support rollers 21, and shredder feed roller 22. Conveyor support rollers 19–22 generally include a shaft rotatably mounted to rigid frame member 11 having a plurality of circular belt supporting members 23 rigidly attached thereto for supporting conveyor belt 18. Upon application of a rotational driving force to rear conveyor support/drive roller 19, which engages belt 18, the remaining conveyor support rollers 20–22 are caused to concomitantly rotate therewith. Particularly, shredder feed roller 22, which is in engagement with belt 18, concomitantly rotates with rear conveyor support/drive roller 19 as a result of belt 18.

Figure 4:
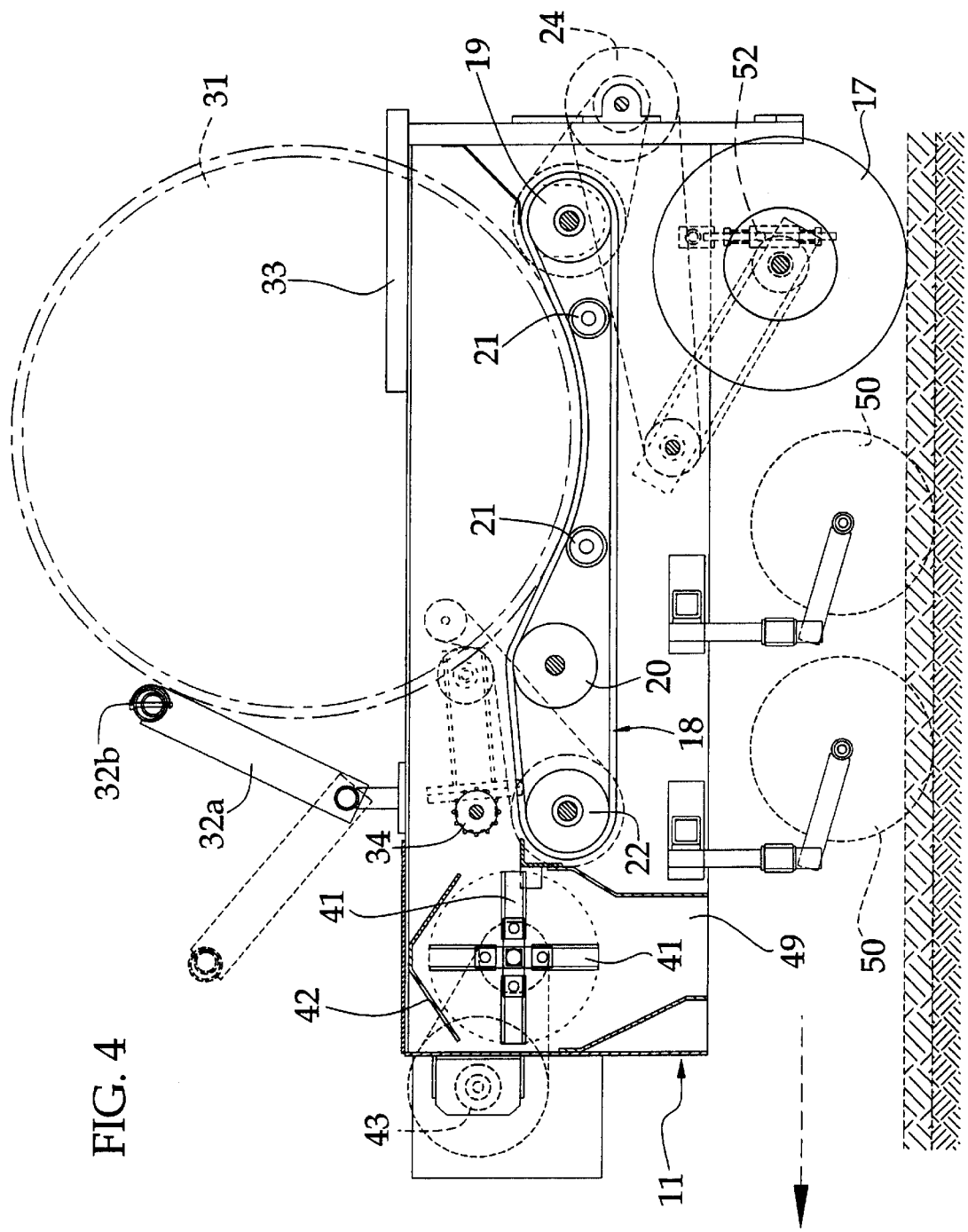
FIG. 4 is a sectional view of the sprigger.
Figure 6:
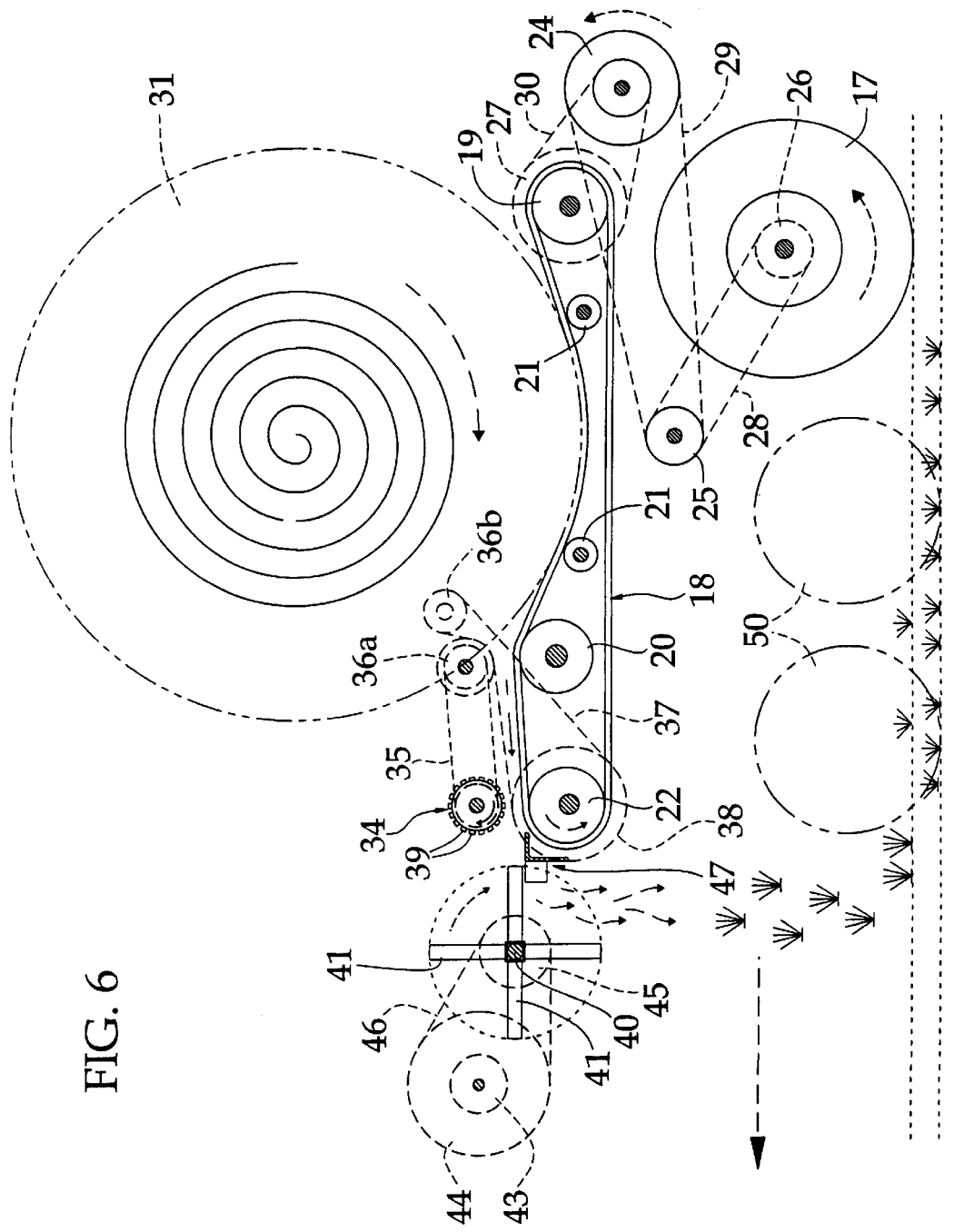
FIG. 6 is a side elevational view of the working components of the sprigger.

A rotational driving force is applied to conveyor assembly via a chain and sprocket arrangement in rotational engagement with rear conveyor support/drive roller 19, as shown in FIGS. 4 & 6. The chain and sprocket arrangement includes a gauge wheel sprocket 26 rigidly mounted to gauge wheel 17 for rotation therewith. A front gauge wheel support member sprocket 25 is rotatably attached to gauge wheel arm 53 proximate the pivot point and engaged with gauge wheel sprocket 26 via first chain 28, thus causing gauge wheel sprocket 26 and front gauge wheel support member sprocket 25 to rotate concomitantly. A rear conveyor idler sprocket 24 is rotatably mounted to the rear portion of sprigger 10 and is engaged with front road wheel support member sprocket 25 via second chain 29, thus causing rear conveyor idler sprocket 24 and front road wheel support member sprocket 25 to rotate concomitantly. Finally, rear conveyor support roller 19 has a rear conveyor support roller sprocket 27 attached thereto for rotation therewith. Rear conveyor support roller sprocket 27 is engaged with rear conveyor idler sprocket 24 via third chain 30 for concomitant rotation therewith, thereby imparting rotational motion to rear conveyor support roller, and conveyor assembly as a whole, upon rotation of gauge wheels 17.

This chain and sprocket arrangement allows for rotation of conveyor belt 18 in direct proportion to the ground speed of sprigger 10. Therefore, while the planting speed of sprigger 10 can be drastically varied to accommodate variances in terrain, the feed rate of the bulk sod to the shredder will remain constantly proportional to the ground speed. Thus, the distribution of sprigs on the ground to be planted remains uniform and the subsequent growth of the sprigs will be constant, evenly spaced, and result in dramatically fewer bare or sparse areas of grass growth. In order to adjust the feed rate of the conveyor assembly to allow for a greater or lesser density of sprig distribution, gauge wheel sprocket 26 can be exchanged for a sprocket with more or less sprocket teeth, thereby respectively decreasing or increasing the feed rate of conveyor assembly and the resulting sprig distribution density.

Conveyor assembly further includes a driven feeder roller 34 rotatably mounted to frame member 11 proximate shredder feed roller 22. Feeder roller 34 includes a plurality of sod engaging members 39 extending therefrom for engaging or gripping the bulk sod being transported thereunder. Feeder roller 34, in addition to being rotatably mounted, is also pivotally mounted such that vertical movement is possible. This vertical movement allows for various thickness' of sod to be engaged by feeder roller 34, as bulk sod of greater thickness will simply urge feeder roller 34 to pivot upward allowing the thicker sod to pass under feeder roller 34. The primary purpose of feeder roller 34 is to engage the bulk sod being transported by conveyor belt 18 to the shredder assembly, such that the sod can be shredded without being lifted off of conveyor belt 18, thus resulting in inconsistent shredding. Driven feeder roller 22 cooperatively engages the bulk sod being transported on conveyor belt 18 to the shredder assembly via driven engagement with fourth chain 35, which is in engagement with rotatably mounted first feeder transfer pulley 36a. Feeder transfer pulley 36a engages fifth chain 37 between rotatably mounted feeder idler pulley 36b and shredder feed roller sprocket 38. Shredder feed roller sprocket 38, which is rigidly attached to shredder feed roller 22, imparts concomitant rotational motion to shredder feed roller sprocket 38. This type of sprocket arrangement, which is clearly shown in FIGS. 4 & 6, allows feeder roller 34 to counter rotate with the conveyor support rollers, thereby successfully engaging and transporting sods of various thickness to the shredder assembly.

The driven shredder assembly, which is best shown in FIGS. 7 and 8, is positioned proximate the front of sprigger 10. Driven shredder assembly includes shredder shroud 42 positioned immediately above a rotatably mounted shredder shaft 40 having a plurality of equally spaced elongated shredder members 41 extending therefrom. Shredder shaft 40 has a shredder shaft sprocket 45 rigidly attached thereto, which is engaged by a sixth chain 46. The sixth chain 46 concomitantly engages a rotational shredder motor 43 via shredder motor sprocket 45, thereby imparting rotation to shredder shaft 40. Although shredder motor 43 is generally of the type of variable speed motors driven by the hydraulic power take off supply of a tractor, other types of motors are contemplated within the present invention. The shredder assembly further includes an elongated cutter bar 47 positioned proximate and axially aligned with shredder shaft 40. Cutter bar 47 includes a plurality of elongated cutter bar members 48 extending therefrom, which interstacially receive shredder bar members 41 upon rotation of shredder shaft 40. Structurally described, cutter bar 47 is generally constructed from an elongated piece of angle iron with tabs of metal welded thereto representing cutter bar members 48.

Figure 5:
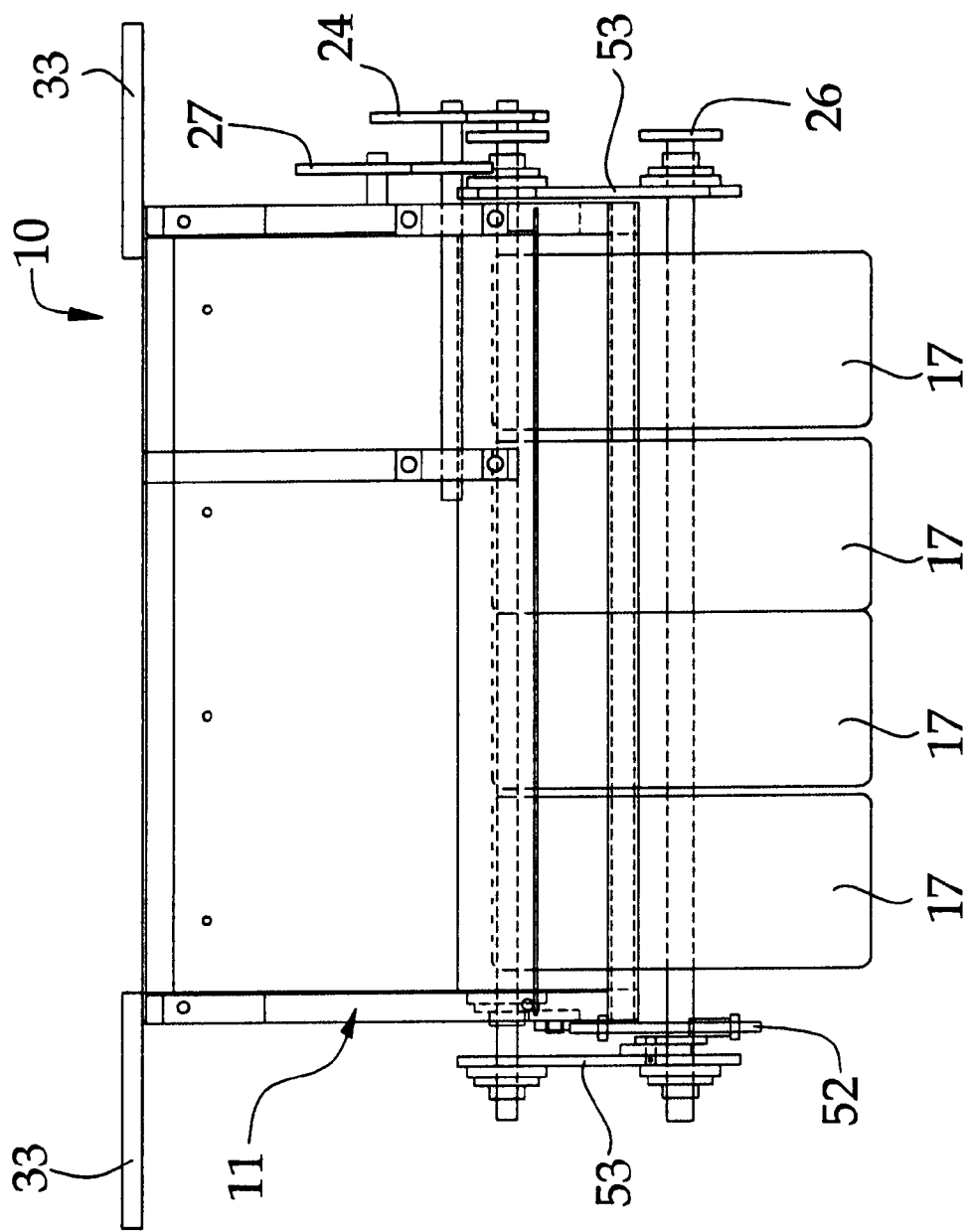
FIG. 5 is an end elevational view of the sprigger.

Planting assembly generally includes a sizable planting chute 49 for directing the grass sprigs shredded by the shredding assembly from sprigger 10 to the ground to be planted 54. Planting chute 49 extends laterally across the interior of sprigger 10 proximate and below shredder shaft 40, therefore allowing gravity to pull the shredded sod in the form of sprigs through planting chute 49 towards the ground to be planted 54. Planting chute 49 is of sufficient width as to eliminate any possibility of clogging due to the presence of excess sprigs, thus increasing the reliability of sprigger 10 along with allowing for a more uniform distribution of the sprigs to be planted. Planting assembly further includes a plurality of rotatably mounted coulters 50 attached to frame member 11 and suspended below sprigger 10. Coulters 50 rotatably engage the ground to be planted 54 and the sprigs deposited thereon, thereby essentially pressing the sprigs 55 into the soil. Planting assembly additionally includes a plurality of gauge wheels 17 rotatably mounted to gauge wheel arm 53, as shown in FIG. 5. Gauge wheel arm 53 is pivotally mounted to rigid frame member 11, such that the distance from rigid frame member 11 to the center of gauge wheels 17 can be varied. Variance of this distance is accomplished through adjustable gauge rod 52, which is attached at one end to rigid frame member 11 and at the other end to gauge wheel arm 53. Varying the distance from rigid frame member 11 to the center of gauge wheels 17 by gauge rod 52 determines the depth coulters 50 penetrate the ground to be planted 54. Thus, adjustment of gauge rod 52 determines the depth sprigs 55 are pressed into the ground to be planted 54. Aside from the adjustment feature attached to gauge wheels 17, gauge wheels 17 primarily serve to firm the soil to be planted 54 subsequent to coulters 50 engaging and pressing sprigs 55 into the soil.

In the operation of sprigger 10, bulk sod, generally in the form of a large sod roll 31, is placed upon conveyor belt 18 immediately above intermediate conveyor support rollers 21. As sprigger 10 is pulled by a tractor or other motor vehicle across the ground to be planted 54, gauge wheels 17 rotate with the passing of linear distance. Rotation of gauge wheels 17 causes conveyor belt 18 to move as a result of the aforementioned chain and sprocket arrangement connecting gauge wheels 17 to rear conveyor support roller 19. This movement unrolls and carries the bulk sod roll 31, sitting upon conveyor 18, from sod roll 31 towards the shredder assembly at a rate proportional to the ground speed of sprigger 10. Simultaneously, with the initial unrolling of sod roll 31, a de-netting assembly 32 removes any securing net from sod roll 31 via a doffing wheel 32b. Immediately prior to entering the shredder assembly, feeder roller 34 engages the bulk sod on the grass side of the sod to further secure the bulk sod upon entering the shredder assembly. As the sod linearly travels atop conveyor 18 and is simultaneously engaged by feeder roller 34, the bulk sod is shredded into plantable grass sprigs by the shredding assembly. The rotating shredder shaft 40 having shredder members 41 extending therefrom engages the sod secured by both shredder feed roller 22 and feeder roller 34 by contacting the grass side of the bulk sod and urging the dirt side of the sod against cutter bar 47 and particularly cutter bar members 48. The sod is then torn by cutter bar members 48 into smaller portions termed grass sprigs 55, which gravitationally fall away from the shredder assembly through planting chute 49. Planting chute 49 distributes the falling grass sprigs 55 to the ground to be planted under the front portion of sprigger 10. Subsequent to falling on the ground to be planted, sprigs 55 are pressed into the ground by coulters 50, which slightly loosen the soil upon pressing sprigs 55 into the ground to be planted. Following coulters 50 is gauge wheels 17, which serve to re-firm the ground loosened by coulters 50, which completes the planting process.

It is to be understood that the form of the invention shown is a preferred embodiment thereof and that various changes and modifications may be made therein without departing from the spirit of the invention or scope as defined in the following claims.

What is claimed is:

1. An apparatus for producing and planting grass springs from bulk sod comprising:
   a) a transportable rigid frame member;
   b) a shredder assembly affixed to said transportable rigid frame member for shredding said bulk sod into said grass sprigs;
   c) a driven conveyor assembly affixed to said transportable rigid frame member proximate said shredder assembly for feeding said bulk sod to said shredder assembly;
   d) means for planting said grass sprigs;
   e) a shredder shaft rotatably mounted to said frame member having a plurality of biased elongated shredding members extending therefrom, said shredder shaft being in rotational engagement with a first means for imparting rotational motion thereto; and
   f) an elongated cutter bar positioned proximate and parallel to said shredder shaft, said cutter bar having a plurality of horizontally displaced substantially vertically aligned cutting tabs extending therefrom capable of receiving said elongated shredding members interstitially upon rotation of said shredder shaft, thereby cooperatively shredding said bulk sod.

2. An apparatus for producing and planting grass sprigs from bulk sod comprising:
   a) a transportable rigid frame member;
   b) a shredder assembly affixed to said transportable rigid frame member for shredding said bulk sod into said grass sprigs;
   c) a driven conveyor assembly affixed to said transportable rigid frame member proximate said shredder assembly for feeding said bulk sod to said shredder assembly;
   d) means for planting said grass sprigs;
   e) a first conveyor support member rotatably mounted to said frame member proximate said shredder assembly;
   f) at least one additional conveyor support member rotatably mounted to said frame member;
   g) a continuous conveyor belt in frictional engagement with said first conveyor support member and said at least one additional conveyor support member for transporting said bulk sod to said shredder assembly;
   h) a feeder roller rotationally and pivotally mounted to said frame member spaced from said first conveyor support member for simultaneously engaging said bulk sod in opposition to said conveyor belt and said first conveyor belt support member; and i) means in rotational engagement with said at least one additional conveyor support member for imparting rotational motion thereto in direct proportion to a ground speed of said apparatus for producing and planting sprigs from bulk sod.

3. The apparatus for producing and planting grass sprigs from bulk sod as defined in claim 2, wherein said means for imparting rotational motion in proportion to a ground speed of said apparatus further comprises a gauge wheel rotationally mounted to said frame, said gauge wheel being in frictional engagement with the ground to be planted by said apparatus, said gauge wheel having a sprocket attached thereto for concomitant rotation therewith, said sprocket being in rotational engagement with said at least one additional conveyor support member, thereby imparting rotational motion to said first conveyor support member, said at least one additional conveyor support member, and said feeder roller proportional to the ground speed of said apparatus.

4. An apparatus for producing and planting grass sprigs from bulk sod comprising:

a) a transportable rigid frame member;

b) a shredder assembly affixed to said transportable rigid frame member for shredding said bulk sod into said grass sprigs;

c) a driven conveyor assembly affixed to said transportable rigid frame member proximate said shredder assembly for feeding said bulk sod to said shredder assembly;

d) means for planting said grass sprigs;

e) a chute means affixed to said frame member immediately below said shredder assembly for gravitationally dispersing said shredded sod grass sprigs on to the ground to be planted by said apparatus;

f) a plurality of coulters rotationally mounted to said frame member behind said chute means, said plurality coulters engaging said ground to be planted such that said dispersed grass sprigs are pressed into said ground to be planted to a predetermined depth by said plurality of coulters; and g) a plurality of gauge wheels rotationally mounted to said frame member behind said plurality of coulters for firming said ground to be planted subsequent to said ground to be planted being engaged by said plurality of coulters.

5. The apparatus for producing and planting grass sprigs from bulk sod as defined in claim 1, 2, 3 or 4 wherein said rigid frame member further comprises a sod storage platform and an operator platform.

6. An apparatus for producing and planting grass sprigs from bulk sod comprising:

a) a transportable rigid frame member;

b) a shredder assembly affixed to said transportable rigid frame member for shredding said bulk sod into said grass sprigs;

c) a driven conveyor assembly affixed to said transportable rigid frame member proximate said shredder assembly for feeding said bulk sod to said shredder assembly;

d) means for planting said grass sprigs; and e) a de-netter adjustably mounted to said rigid frame member for removing a securing net from a bulk roll of sod.

7. An apparatus for producing grass sprigs from bulk sod, and thereafter planting said grass sprigs comprising:

a) a rigid frame member having selectively retractable transport wheels affixed thereto;

b) a driven conveyor assembly affixed to said rigid frame member having a first conveyor support roller rotatably mounted to said frame member, and at least one additional conveyor support roller rotatably mounted to said frame member, said first conveyor support roller and said at least one additional conveyor support roller having a continuous conveyor belt cooperatively in frictional engagement therewith for transporting said bulk sod, and a sod feeder roller rotationally and pivotally displaced proximate said first conveyor support roller for cooperatively engaging said transported bulk sod with said conveyor belt and said first conveyor support roller;

c) a driven shredder assembly affixed to said rigid frame member proximate said first conveyor support roller for shredding said bulk sod into said plantable grass sprigs, thereafter depositing said plantable grass sprigs on the surface of the ground to be planted;

d) a plurality of coulters rotatably affixed to said rigid frame member, said plurality of coulters being in engagement with said ground to be planted, thereby sprigging said plantable grass sprigs into said ground to be planted; and e) means for firming said ground to be planted subsequent to said plurality coulters sprigging said ground to be planted.

8. An apparatus for producing grass sprigs from bulk sod and thereafter planting said grass sprigs as defined in claim 7, wherein said driven conveyor assembly further includes means for rotating said conveyor assembly in proportion to a ground speed of said apparatus comprising:

a) at least one gauge wheel rotatably attached to said frame member, said gauge wheel being in rotational engagement with said ground to be planted;

b) a drive sprocket attached to said gauge wheel for concomitant rotation therewith; and c) a drive linkage cooperatively in engagement with said drive sprocket and said conveyor assembly for imparting rotational motion to said conveyor assembly in proportion to the ground speed of said apparatus.

9. An apparatus for producing grass sprigs from bulk sod and thereafter planting said grass sprigs as defined in claim 7, wherein said driven shredder assembly further comprises:

a) a shredder shaft in mechanical engagement with a motor means for imparting rotational motion, said shredder shaft being rotatably mounted to said frame member, said shaft having a plurality of elongated shredding members extending therefrom;

b) an elongated cutter bar rigidly mounted to said frame member proximate said shredder shaft, said cutter bar having a plurality of vertically aligned cutting tabs extending therefrom capable of receiving said elongated shredding members interstitially upon rotation of said shredder shaft, thereby producing said grass sprigs from said bulk sod; and c) a sprig chute attached to said frame member for directing said grass sprigs to said ground to be planted.

10. An apparatus for producing grass sprigs from bulk sod and thereafter planting said grass sprigs as defined in claim 7, further comprising a first support platform for storing slabs of said bulk sod and a second support platform for supporting an operator.

11. An apparatus for producing grass sprigs from bulk sod and thereafter planting said grass sprigs as defined in claim 7, further comprising means for removing a securing wrap from a roll of said bulk sod placed on said apparatus.

12. A portable apparatus for shredding bulk sod into plantable grass sprigs comprising:
   a) a driven bulk sod conveyor assembly having a continuous conveyor belt rotatably supported by a sod receiving end roller member and a sod delivering end roller member;
   b) a sod shredding assembly positioned proximate said sod delivering end roller member, said shredding assembly having a rotatably mounted driven shaft having a plurality of elongated shredding members extending therefrom and an elongated cutter bar positioned proximate said driven shaft and having a plurality of substantially vertically aligned sod cutting members extending therefrom for shredding said bulk sod into said plantable grass sprigs and depositing said plantable grass sprigs on the ground to be planted;
   c) a plurality of rotatably mounted coulters for sprigging said plantable grass sprigs into said ground to be planted; and
   d) means for firming said ground to be planted subsequent to said coulters sprigging said ground to be planted.

\* \* \* \* \*